United States Patent
Bron et al.

(10) Patent No.: US 10,412,209 B2
(45) Date of Patent: Sep. 10, 2019

(54) SIGNALING SYSTEM

(71) Applicant: KONINKLIJKE PHILIPS N.V., Eindhoven (NL)

(72) Inventors: Andries Bron, Eindhoven (NL); Renger Ypenburg, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 107 days.

(21) Appl. No.: 15/314,987

(22) PCT Filed: Jun. 3, 2015

(86) PCT No.: PCT/EP2015/062312
§ 371 (c)(1),
(2) Date: Nov. 30, 2016

(87) PCT Pub. No.: WO2015/189076
PCT Pub. Date: Dec. 17, 2015

(65) Prior Publication Data
US 2018/0205814 A1 Jul. 19, 2018

(30) Foreign Application Priority Data

Jun. 12, 2014 (EP) .................................. 14172140

(51) Int. Cl.
*H04M 1/725* (2006.01)
(52) U.S. Cl.
CPC ..... *H04M 1/7253* (2013.01); *H04M 1/72533* (2013.01); *H04M 1/72536* (2013.01); *H04M 2250/02* (2013.01); *H04M 2250/04* (2013.01)

(58) Field of Classification Search
CPC ..................... H04M 1/72533; H04M 1/72536
See application file for complete search history.

(56) References Cited

U.S. PATENT DOCUMENTS

| | | | |
|---|---|---|---|
| 7,406,399 B2 * | 7/2008 | Furem | E02F 9/267 37/379 |
| 8,238,203 B2 | 8/2012 | Morohoshi | |
| 8,547,200 B2 | 10/2013 | Han | |
| 9,024,716 B2 | 5/2015 | Yum | |
| 2004/0236547 A1 * | 11/2004 | Rappaport | G06F 17/509 703/2 |
| 2006/0020380 A1 * | 1/2006 | Saito | B60G 17/0185 701/31.4 |
| 2006/0123570 A1 | 6/2006 | Pace | |
| 2006/0155431 A1 | 7/2006 | Berg | |
| 2008/0280562 A1 * | 11/2008 | Zebic | H04L 12/282 455/41.2 |
| 2010/0240402 A1 | 9/2010 | Wickman | |

(Continued)

FOREIGN PATENT DOCUMENTS

| | | |
|---|---|---|
| CN | 201360311 Y | 12/2009 |
| JP | 2010092401 A | 4/2010 |
| JP | 2013150356 A | 1/2013 |

*Primary Examiner* — Ayodeji O Ayotunde

(57) ABSTRACT

A signaling system comprises a user device, and a personal computing device separate from the user device and configured to inform a user about the user device based on information received by the personal computing device from a remote server. In accordance with the present invention, the user device has an indicator to alert the user to use the personal computing device to get information relating to the user device.

16 Claims, 2 Drawing Sheets

(56) References Cited

U.S. PATENT DOCUMENTS

| | | |
|---|---|---|
| 2010/0259377 A1 | 10/2010 | Cho |
| 2010/0305807 A1 | 12/2010 | Basir |
| 2011/0245947 A1 | 10/2011 | Morohoshi et al. |
| 2011/0312278 A1* | 12/2011 | Matsushita ....... H04L 12/40013 455/66.1 |
| 2013/0193204 A1 | 8/2013 | Kerscher |
| 2013/0217364 A1 | 8/2013 | Varoglu |
| 2013/0247117 A1* | 9/2013 | Yamada ................ G08C 17/02 725/93 |
| 2016/0036958 A1* | 2/2016 | Logan .................... H04W 4/80 455/414.1 |

* cited by examiner

SIGNALING SYSTEM

This application is the U.S. National Phase application under 35 U.S.C. § 371 of International Application No. PCT/EP2015/062312, filed on Jun. 3, 2015, which claims the benefit of International Application No. 14172140.7 filed on Jun. 12, 2014. These applications are hereby incorporated by reference herein.

FIELD OF THE INVENTION

The invention relates to a signaling system, to a user device having an indicator for use in the signaling system, and to making available an app for configuring a personal computing device for use in the signaling system.

BACKGROUND OF THE INVENTION

US2006/0020380 discloses an on-vehicle breakdown-warning report system. An occurrence of break-down is detected and judged based on a signal in an electronic control system installed on a control apparatus for an engine ignition system, a charging system, an engine fuel system, an engine cooling system, a power transmission system, and an oil lubricating system of an automobile or a diagnosis display system; and diagnostic data is sent to an information terminal device of a diagnosis and maintenance agency or a service company having a diagnosis and maintenance agency as a contents information by using an on-vehicle mobile communication apparatus, and an action for emergency measures and a maintenance schedule is requested.

US2010/0259377 discloses a home appliance (e.g. a washing machine) including a main controller for generating a first data signal including status information and a second data signal including operating information, a first sound output device for outputting a first sound signal according to the first data signal including status information to be transmitted through a communication network (a telephone network via a user's telephone) to a service center, and a second sound output device for outputting a second sound signal according to the second data signal including operating information to be perceived by a user. The service center checks the received first sound signal and extracts the status information included in the first sound signal to analyze the operating state of the home appliance and to determine the cause of the failure, and dispatches a service technician to the residence of the user to provide a service suitable for the cause of failure.

SUMMARY OF THE INVENTION

It is, inter alia, an object of the invention to provide a signaling system and user device that offer enhanced opportunities to provide a user with information relating to the user device. The invention is defined by the independent claims. Advantageous embodiments are defined in the dependent claims.

One aspect of the invention relates to a signaling system comprising a user device, and a personal computing device separate from the user device and configured to inform a user about the user device based on information received by the personal computing device from a remote server. In accordance with the present invention, the user device has an indicator to alert the user to use the personal computing device to get information relating to the user device.

The invention provides the advantage that a user does not have to regularly bring his user device in contact with his personal computing device to check whether the user device has something to tell, as the user device itself provides an indication to the user that the user should consult his personal computing device to be informed about the user device.

The invention thus provides a user device with a means to request interaction with a user. This is especially interesting if the user device has interesting information available, like e.g. maintenance information.

The personal computing device may be configured to communicate with the user device to switch on the indicator if a remote server has information relating to the user device. This embodiment provides the advantage that the user is informed in a very natural way, i.e. by his user device, if a remote server has information on the user device that can be viewed on the personal computing device.

The information may have been generated in response to a communication sent by the user device. For example, the user device may have noted that it requires maintenance, e.g. a new bag should be put into a vacuum cleaner, a filter should be replaced, or some other maintenance may be needed. The user device could send information to the personal computing device or to the remote server. If information is sent to the remote server, depending on the user device's communication abilities, the information sent to the remote server could be sent directly (e.g. via the Wi-Fi network in the user's home) or via NFC or Bluetooth to the personal computing device, which would then forward the information to the remote server. The remote server will then prepare information and make it available to the personal computing device, and request (again, either directly or via the personal computing device) the user device to switch on its indicator.

The user device may be configured to activate the indicator in order to trigger a user to establish a connection between the user device and the personal computing device. This embodiment allows the user device to send a message to the personal computing device, in response to which message the personal computing device may provide information to the user, or contact the remote server to provide information.

Another aspect of the invention provides a user device comprising a communication unit; and an indicator to alert a user to use a personal computing device separate from the user device to get information relating to the user device.

Another aspect of the invention provides a method of making available an app for configuring a personal computing device to provide information on a user device to a user, wherein the app is configured to communicate to the user device to switch on an indicator to alert the user to use the personal computing device to get information relating to the user device. Herein, the word app covers both an app for use on a smartphone or tablet, and software for use on a conventional PC. The method of making available the app is used both when the app is made, and when the app is made available from downloading from e.g. Apple's App Store, Google's Play Store, and the Windows Store. Herein, the app configuring the personal computing device means that the app runs as software on the personal computing device so as to allow the personal computing device to fulfil its role in the present invention as described herein.

Yet another aspect of the invention provides a method of providing information on a user device to a user by means of a personal computing device, the method comprising receiving the information from a memory in the personal computing device (e.g. the memory where the app is stored after it has been installed on the personal computing device)

or from a remote server, and communicating to the user device to switch on an indicator to alert the user to use the personal computing device to get the information relating to the user device.

These and other aspects of the invention will be apparent from and elucidated with reference to the embodiments described hereinafter.

BRIEF DESCRIPTION OF THE DRAWINGS

The example embodiments are best understood from the following detailed description when read with the accompanying drawing figures. It is emphasized that the various features are not necessarily drawn to scale. Wherever applicable and practical, like reference numerals refer to like elements throughout the drawing figures.

DETAILED DESCRIPTION OF EMBODIMENTS

Figure 1:
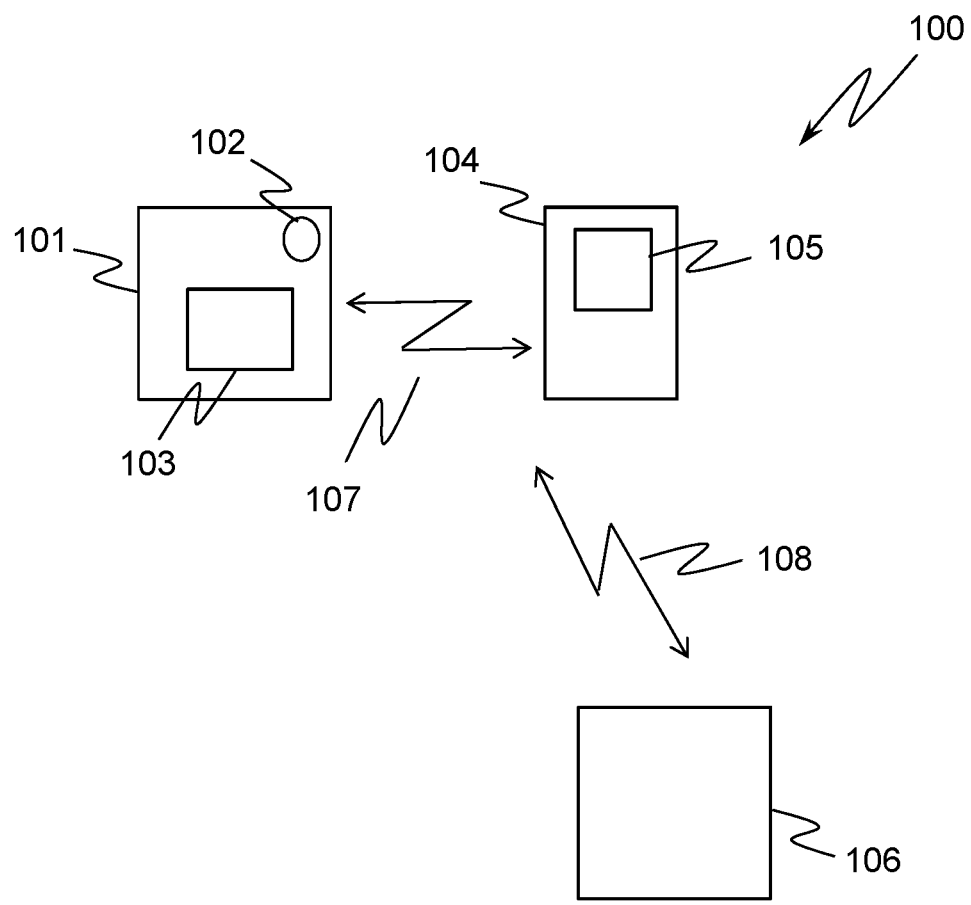
FIG. 1 is a simplified block diagram of a signal system for providing information regarding a user device through a personal computing device, according to an illustrative embodiment of the invention.

An embodiment of the invention of a signal system 100 shown in FIG. 1 has three separate units:

1. A user device 101, such as a domestic appliance (e.g. a vacuum cleaner, a coffee machine, a food preparation device, or an air conditioner) or a personal care device (e.g. a shaver, a skincare device or a power toothbrush). The user device has an indicator 102 (e.g. a LED or a display) that prompts a user to check his personal computing device to get information relating to the user device. The user device also has a communication unit 103 to contact the personal computing device and/or a remote server. The communication unit may use e.g. NFC or Bluetooth network 107, or a Wi-Fi network 108.

2. A personal computing device 104, e.g. a smartphone, a tablet or a conventional PC, all of which having a display 105 to provide information to a user.

3. A remote server 106, from which an app can be downloaded for configuring the personal computing device, and which remote server can provide various information about the user device. There may be multiple remote servers, e.g. a first one from which the app can be downloaded, and another from which information is available. In an alternative embodiment, all information (including all possible reactions to all possible errors messages) is included into the app, so that the remote server's role is just to provide the app.

In one embodiment, the personal computing device is a smartphone or tablet running an app provided by a manufacturer of the user device. The user device may be a domestic appliance or personal care device having NFC or Bluetooth communication tools to communicate with the personal computing device. This allows the user device to indirectly communicate with the remote server, via the personal computing device. Alternatively, the user device may use the Wi-Fi network in the user's home to directly communicate with the remote server.

The indicator may be a visible indication e.g. a LED or a signal on a display but also audible and tactile signals can tell the user "New interesting data is available for you".

The information that relates to the user device may be maintenance information, but it may alternatively be information telling a user that in view of the way he uses his shaver (e.g. if his beard is tougher to cut than an average beard), he better use the shaver together with a shaving cream or lotion.

The invention may be advantageously used with user devices being e.g. beauty devices with NFC tagged mechanical parts. The NFC tagged parts contain settings for proper operation of the beauty device with respect to e.g. speed and vibration. The current trend is gathering of all kind of data, for that reason products will become equipped with dynamic tags or with NFC readers that emulate tags to get data out of the product rather than into the product.

Other products might become equipped with other wireless or wired protocols meaning that all kinds of device information like replacement triggers, battery state, cleaning state and all information can be made available to a smart device like a tablet PC, phone or other device.

Figure 2:
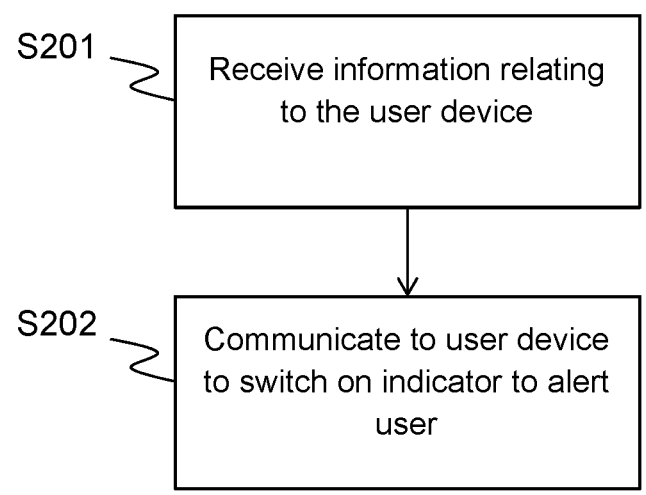
FIG. 2 is a simplified flow diagram of a method for providing information regarding a user device through a personal computing device, according to an illustrative embodiment of the invention.

As discussed above, an embodiment of the invention as shown in FIG. 2 provides a method of providing information relating to a user device to a user by means of a personal computing device. The method comprises receiving the information in block 5201 from a memory in the personal computing device (e.g. the memory where the app is stored after it has been installed on the personal computing device) or from a remote server, and communicating to the user device in block 5202 to switch on an indicator to alert the user to use the personal computing device to get the information relating to the user device.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:
1. A signaling system comprising:
 a user device including an indicator, the user device being configured to activate the indicator when a remote server has information relating to the user device; and
 a personal computing device comprising a display, the personal computing device being separate from the user device and configured to inform a user about the user device via the display based on the information relating to the user device received by the personal computing device from the remote server;
 wherein the indicator alerts the user to use the personal computing device to get the information relating to the user device from the remote server.
2. The signaling system as claimed in claim 1, wherein the personal computing device is further configured to switch on the indicator of the user device when the remote server has the information relating to the user device.

3. The signaling system as claimed in claim 1, wherein the information is provided to the personal computing device in response to a communication sent by the user device to the remote server.

4. The signaling system as claimed in claim 1, wherein the user device is further configured to activate the indicator in order to trigger the user to establish a connection between the user device and the personal computing device.

5. The signaling system as claimed in claim 1, wherein the personal computing device is a smartphone, a tablet or a PC.

6. A user device comprising:
   an indicator for alerting a user to use a personal computing device separate from the user device to get information relating to the user device, the information being received by the personal computing device from one of a memory or a remote server, and displayed via a display of the personal computing device; and
   a communication unit configured to communicate with the remote server and/or with the personal computing device,
   wherein the user device is configured to activate the indicator in response to a request from the remote server, or in response to a request from the personal computing device when the personal computing device is informed that the remote server has the information relating to the user device.

7. The user device as claimed in claim 6, wherein the indicator further triggers the user to establish a connection between the user device and the personal computing device.

8. A method of providing information relating to a user device to a user through a personal computing device separate from the user device, the information being displayed on a display of the personal computing device, the method comprising:
   receiving the information relating to the user device at the personal computing device from a memory in the personal computing device or from a remote server; and
   communicating from the personal computing device to the user device to switch on an indicator of the user device to alert the user to view the information relating to the user device on the personal computing device.

9. The method as claimed in claim 8, wherein the personal computing device is a smartphone, a tablet or a PC.

10. The method as claimed in claim 8, further comprising:
    receiving a communication sent by the user device, wherein the information relating to the user device is received in response to the communication sent by the user device.

11. The signaling system as claimed in claim 5, wherein the user device is a domestic appliance.

12. The signaling system as claimed in claim 5, wherein the user device is a personal care device.

13. The method as claimed in claim 9, wherein the user device is a domestic appliance.

14. The method as claimed in claim 9, wherein the user device is a personal care device.

15. The signaling system as claimed in claim 1, wherein the indicator of the user device comprises a visual signal, an audible signal or a tactile signal.

16. The user device as claimed in claim 6, wherein the indicator comprises a visual display on the user device or an audible signal or a tactile signal output by the user device.

\* \* \* \* \*